(12) United States Patent
Bae et al.

(10) Patent No.: US 7,559,510 B1
(45) Date of Patent: Jul. 14, 2009

(54) ELEVATOR VARIABLE FEEL UNIT

(75) Inventors: Kwan-Ho Bae, Corona, CA (US); Hugh R. Parkes, Redmond, WA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 414 days.

(21) Appl. No.: 11/528,059

(22) Filed: Sep. 27, 2006

(51) Int. Cl.
*B64C 13/04* (2006.01)
(52) U.S. Cl. ............... 244/223; 244/232; 244/234; 244/99.2; 244/99.3
(58) Field of Classification Search ............ 244/99.2, 244/99.3, 223, 232, 234; 74/470, 522
See application file for complete search history.

(56) References Cited

U.S. PATENT DOCUMENTS

| | | | | |
|---|---|---|---|---|
| 2,684,215 | A | * | 7/1954 | Ashkenas ............ 244/223 |
| 2,881,993 | A | * | 4/1959 | Browne ............... 244/223 |
| 3,045,957 | A | * | 7/1962 | Boyce et al. ......... 244/223 |
| 3,415,469 | A | * | 12/1968 | Spratt ................. 244/48 |
| 3,747,876 | A | * | 7/1973 | Fortna et al. ........ 244/223 |
| 3,897,695 | A | * | 8/1975 | Rostad ................ 74/516 |
| 4,403,756 | A | * | 9/1983 | Berlin et al. ......... 244/227 |
| 4,477,044 | A | * | 10/1984 | Darcy et al. ......... 244/223 |

* cited by examiner

*Primary Examiner*—Michael R Mansen
*Assistant Examiner*—Philip J Bonzell

(74) *Attorney, Agent, or Firm*—Daniel M. Barbieri

(57) ABSTRACT

An elevator variable feel unit for aircraft pilot control. The variable feel unit has a single cam and a roller unit. The cam attaches by a spline to the input shaft and input crank of the feel unit. The input crank, connected to the control column torque tube, turns the shaft and the cam. A cam follower arm assembly has a roller that causes a cam follower arm to pivot as the cam is pivoted due to movement of the control column. Two base feel centering springs between the cam follower arm and a fixed point to keep the roller on the cam, and provide the base feel force and a centering function. In a base feel position, the preload on the base feel spring keeps the variable feel unit in a detent position. The variable feel spring has a minimum preload and does not add to the feel at low airspeed. When the control column is moved, the movement causes an increase in the extension of the base feel springs, thus increasing the feel forces at the column. The feel at the control column increases with the amount of column movement. In this base feel configuration, the variable feel spring does not stretch throughout the full movement of the control column. As the airspeed increases, the elevator feel actuator extends to change the configuration of the feel mechanism in the feel unit, by rotating the variable feel arm up as the airspeed increases. When the control column is moved at higher airspeed, it causes an increase in the extension of the variable feel springs, as well as base feel springs. These two forces increase the feel forces at the control column. Increased rotation of the variable feel arm further causes additional extension of the variable feel spring, and thus the column force.

18 Claims, 8 Drawing Sheets

ELEVATOR VARIABLE FEEL UNIT

FIELD OF THE INVENTION

The present invention relates to aircraft pilot controls and more particularly relates to the "wheel-and-column" pilot controls of the aircraft's elevators.

ART BACKGROUND

An aircraft's movement in flight is controlled by rotating the craft in its pitch, roll and yaw axes. Pitch is rotation around the lateral or transverse axis. This axis is parallel to the wings, thus the nose pitches up and the tail down, or vice-versa. An aircraft pitches up to climb and pitches down to dive. An aircraft increases or decreases the lift generated by the wings when it pitches up or down by increasing or decreasing the angle of attack (AOA) through the lateral axis. Roll is rotation around the longitudinal axis—an axis drawn through the body of the vehicle from tail to nose. Yaw is rotation about the normal axis—an axis perpendicular to the pitch and roll axes.

To control the pitch rotation of aircraft such as the Boeing 777, the pilots operate conventional "wheel-and-column" controls to manually command the elevators of the aircraft. A simplified diagram of conventional "wheel-and-column" controls in the flight deck is illustrated in FIG. 1 (a). To pull the airplane's nose up, e.g. during take-off or landing, the pilot would pull the column toward himself. Pushing the column away would do the opposite to the nose.

In a conventional elevator control, when the control column is pushed or pulled by the pilot, i.e. pilot commands, position transducers change the pilot commands to analog electrical signals. FIG. 1 (b) shows a simplified diagram of the pilot control and the elevator control unit. These signals are transmitted to a Flight Computer Electronics 240 ("FCE"), which uses the signals to compute the requisite control surface commands. The FCE 240 also uses airspeed data to calculate elevator feel commands, which are sent to a feel actuator 430 on the elevator feel unit 10. The feel actuator 430 supplies to the control column 12 a variable feel based on the airspeed. As is well-known to those skilled in the art, the variable feel unit 10 prevents the pilot from making unsafe pitch adjustments, by gradually stiffening the control column 12 at higher airspeed. The variable feel unit 10 also supplies a centering function that returns the control column 12 to a neutral position.

The conventional elevator variable feel control typically includes bi-directional hinge-type cam roller mechanisms. The bi-directional hinge mechanism typically utilizes compression springs, slotted cam roller and pivoting linkages to provide centering and variable feel functionality. The overall mechanism is complex, heavy, has backlash at neutral position, and offers little flexibility for tailoring the feel forces.

Therefore, it is desirable to have a less complex and lightweight variable feel unit for the elevator control.

It is also desirable to have a variable feel unit that can be customized or tailored for different feel forces.

SUMMARY OF THE INVENTION

An elevator variable feel unit for aircraft pilot control is disclosed. The variable feel unit has a single cam and a roller unit. The cam attaches by a spline to the input shaft and input crank of the feel unit. The input crank, connected to the control column torque tube, turns the shaft and the cam. A cam follower arm assembly has a roller that causes the cam follower arm to pivot as the cam is pivoted due to movement of the control column. Two base feel centering springs attached to a non-pivoting end of the cam follower arm keep the roller on the cam, and provide the base feel force and a centering function.

The elevator feel actuator is in a fully retracted position for base feel situation. In this position, the preload on the base feel spring keeps the variable feel unit in a detent position. The variable feel spring has a minimum preload and does not add to the feel at low airspeed. When the control column is moved, the movement causes an increase in the extension of the base feel springs, thus increasing the feel forces at the column. The feel at the control column increases with the amount of column movement. In this base feel configuration, the variable feel spring does not stretch throughout the full movement of the control column.

The feel at the control column increases with the amount of column movement and airspeed. As the airspeed increases, the elevator feel actuator extends to change the configuration of the feel mechanism in the feel unit, by rotating the variable feel arm up as the airspeed increases. When the control column is moved at higher airspeed, it causes an increase in the extension of the variable feel springs, as well as base feel springs. This two forces increase the feel forces at the control column. Increased rotation of the variable feel arm further causes additional extension of the variable feel spring, and thus the column force.

To achieve a constant breakout force at all airspeed configurations, the variable feel unit of the present invention further has a detent bias device. In the detent position, the base feel spring preload forces are balanced by the detent bias spring through a detent lever that is in contact with the roller on the cam follower arm. When the control column is moved out of detent, it causes the cam follower arm to rotate and the detent lever to be disengaged from the roller on the cam follower arm, thus altering the load on the variable feel spring.

BRIEF DESCRIPTION OF THE DRAWINGS

Additional objects, features and advantages of the present invention will become apparent from the following disclosure, wherein:

FIG. 1 (b) illustrates a simplified diagram of the pilot control and the elevator control unit.

FIG. 6 (b) illustrates a bottom view of the cam follower arm 332, where the roller 263 has the same rotational axis as the bearings 261.

DETAILED DESCRIPTION OF THE PREFERRED EMBODIMENT

An elevator variable feel unit for aircraft pilot control is disclosed. The novel elevator variable feel unit aims to achieve the design goals of light-weight, simplicity, compactness and positive centering. In the description that follows, numerous specific details are set forth to provide a more thorough understanding of the present invention. It will be apparent, however, to one ordinarily skilled in the art that the present invention may be practiced without these specific details. In other instances, well-known features have not been described in detail so as not to obscure the present invention.

Figure 1:
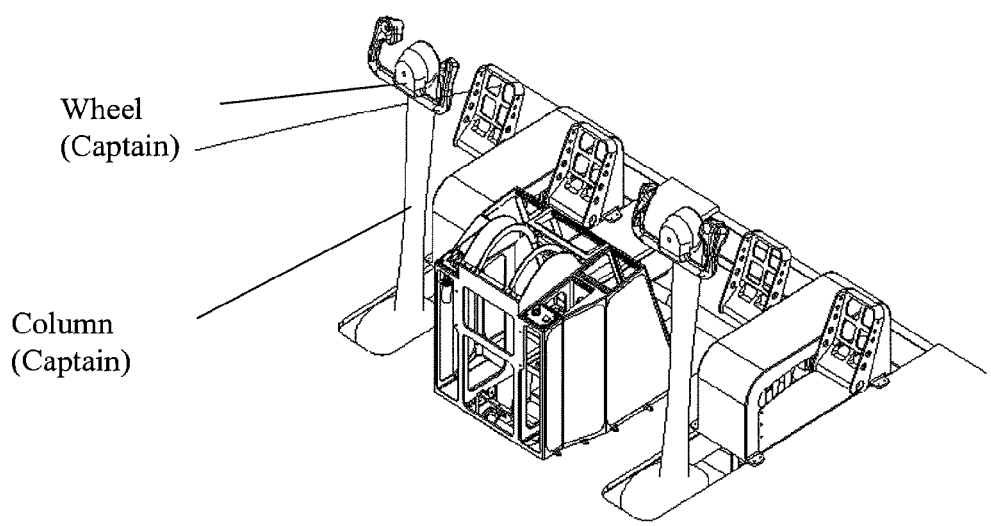
FIG. 1 (a) illustrates a simplified diagram of a conventional "wheel-and-column" controls in the flight deck.
Figure 1:
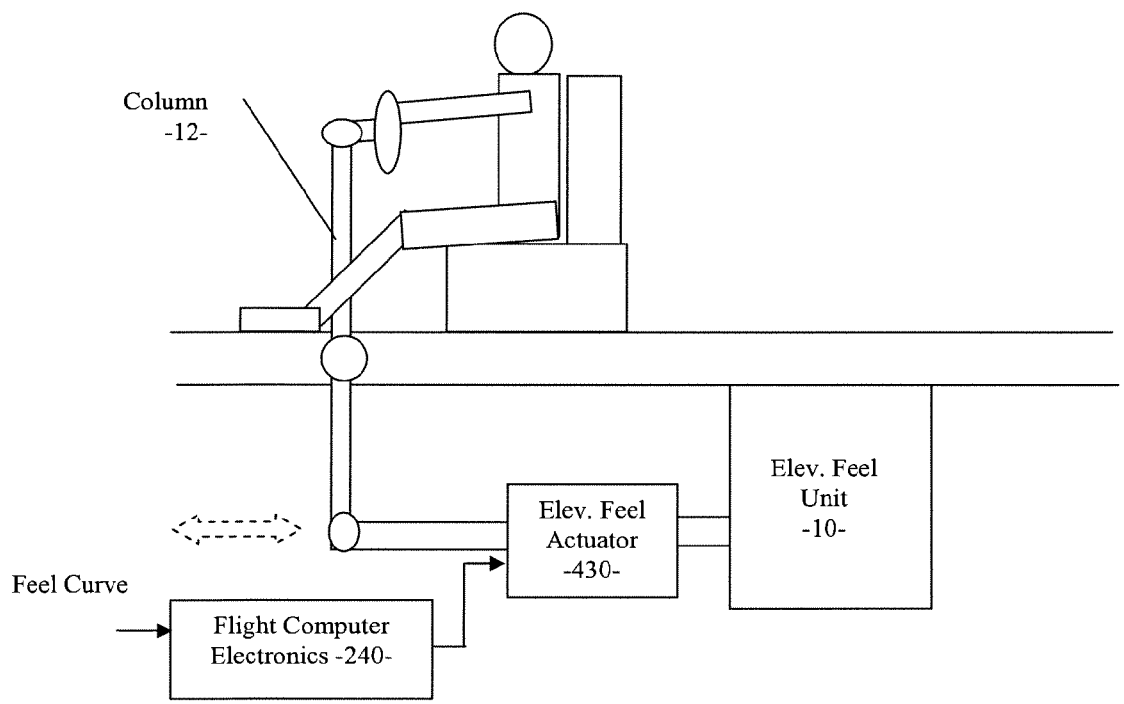
Figure 2:
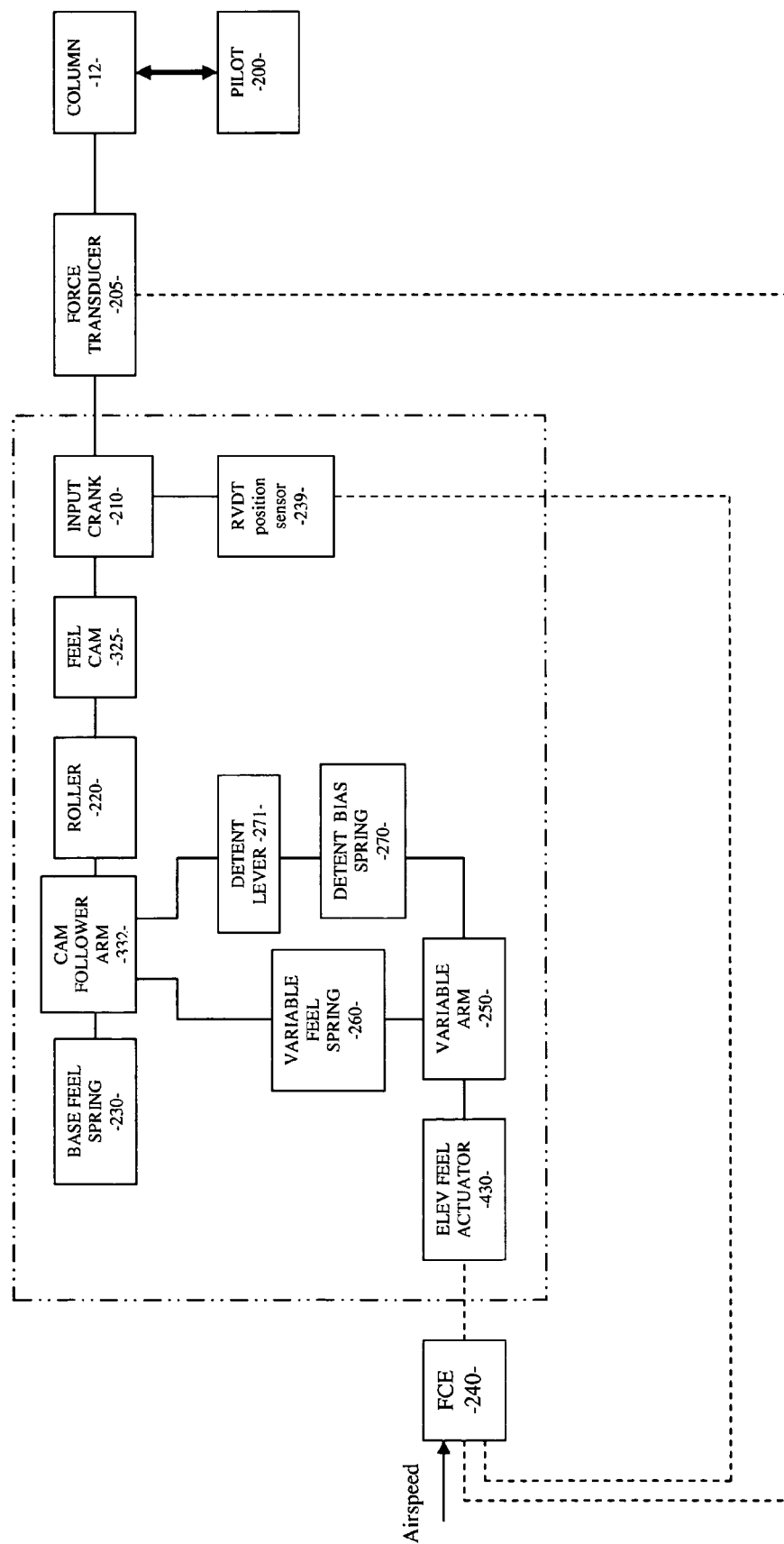
FIG. 2 illustrates a simplified system diagram of the exemplary variable feel unit in accordance with the present invention.
Figure 3:
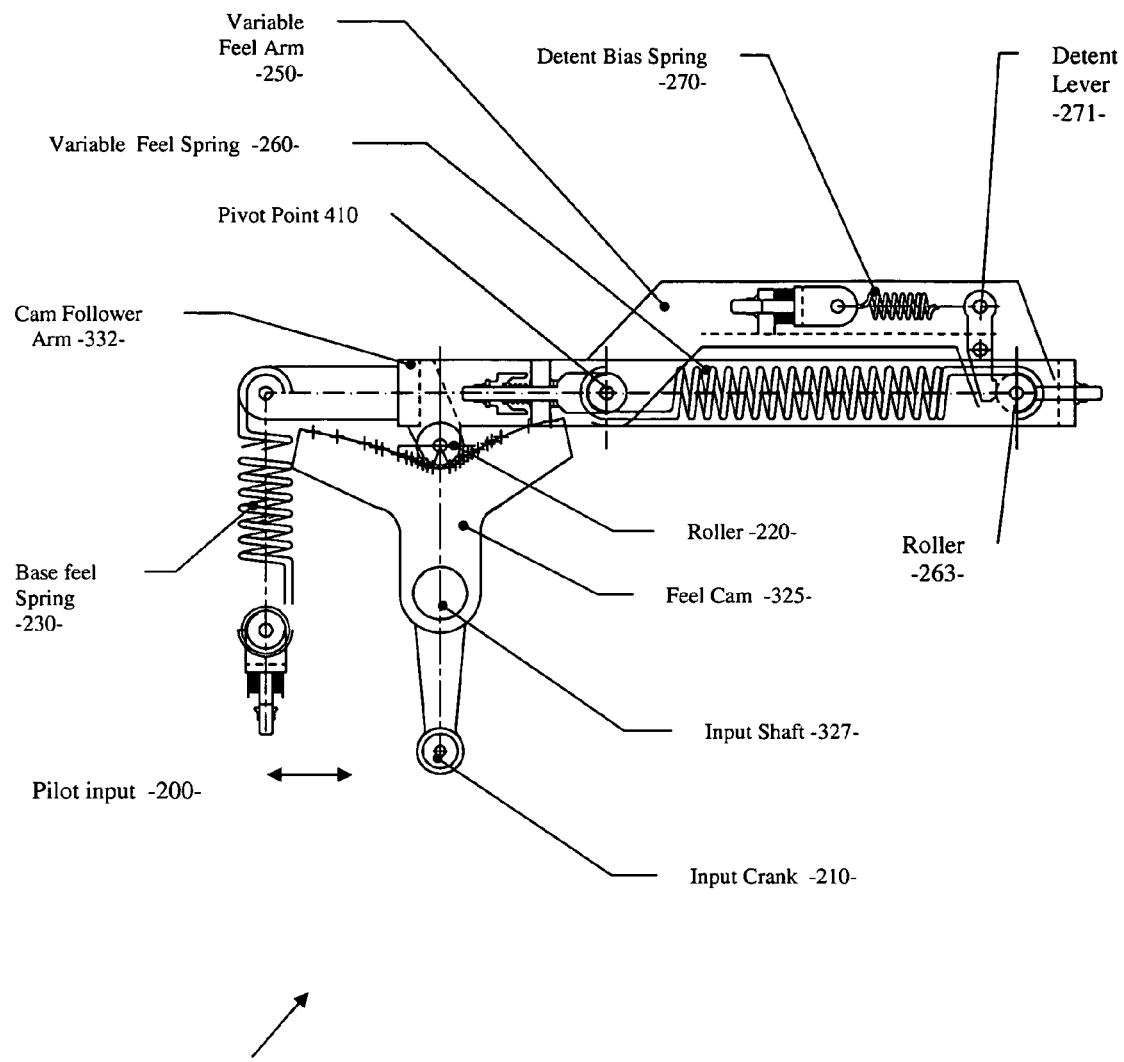
FIG. 3 illustrates a simplified structural diagram of the exemplary variable feel unit 30 in accordance with the present invention.

A simplified system diagram of the variable feel unit is illustrated in FIGS. 2 and 3. Pilot input 200, e.g. the pulling of the control column 12 (commonly referred to as "column aft") by the pilot, is applied to the input crank 210 through the column 12 and a force transducer 205. The input crank 210 then causes the feel cam 325 to pivot or tilt, forcing the roller 220 to pivot the cam follower arm 332 (a.k.a. base arm) about its center pivot point 410 (FIGS. 3-6). The movement of the cam follower arm 332 is countered by the stretching of the base feel spring 230, which provides the feel force to the pilot. When the pilot releases the control column 12, the base feel spring 230 naturally recoils, thus causing the roller 220 to roll back to its neutral position on the feel cam 325. The position of the input crank 210 is sensed by a RVDT 239 ("rotary variable differential transformer), and forwarded to the FCE 240.

Referring to FIG. 3, the feel mechanism has a feel cam 325 and a cam follower arm 332 with a cam roller 220 supported by the feel cam 325. The cam follower arm 332 has a pivot point 410 in the middle and supports a variable feel spring 260 at a first end and base feel springs 230 at a second end.

Figure 4:
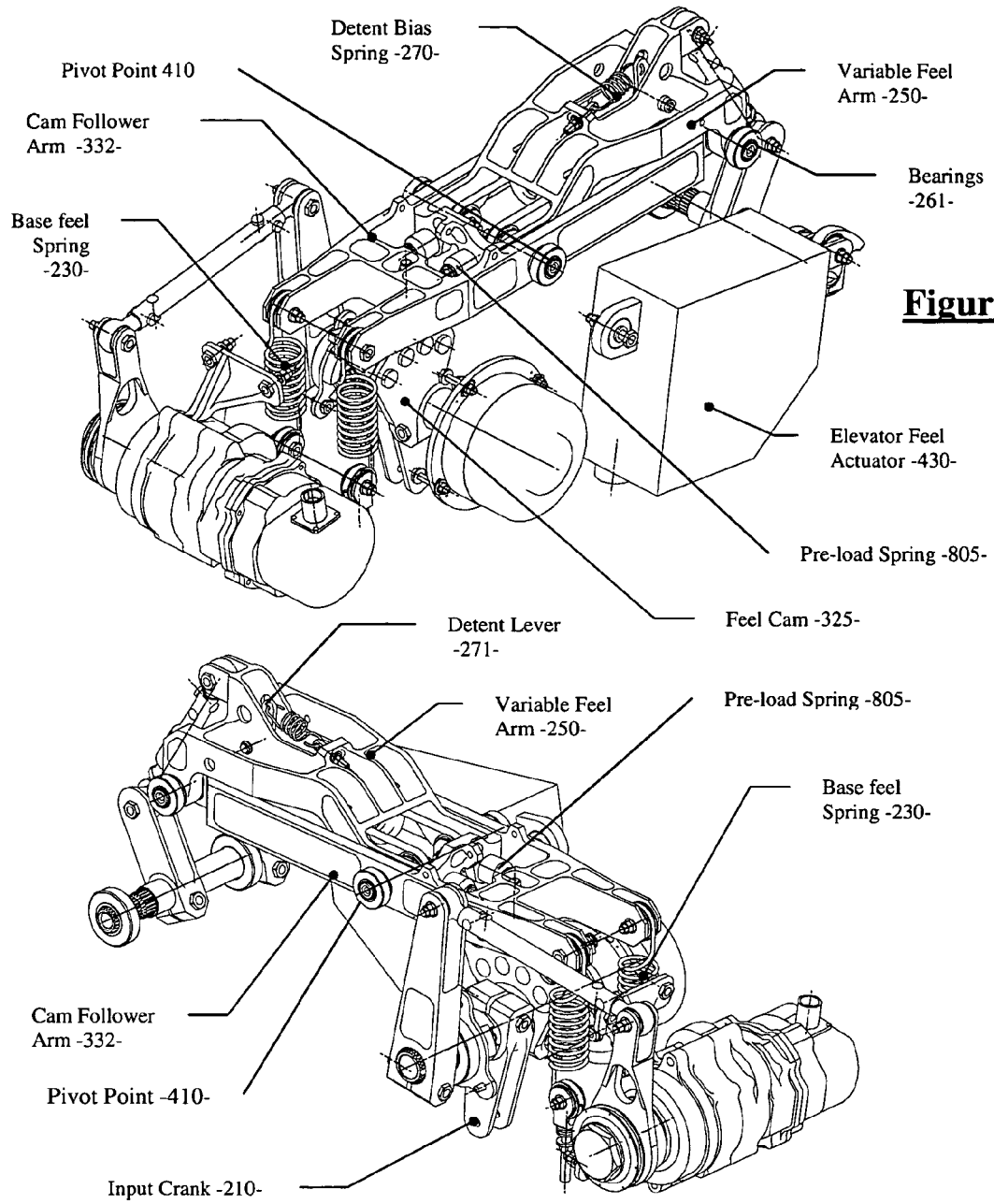
FIGS. 4 (a) and (b) illustrate a perspective view of the exemplary variable feel unit 30 in accordance with the present invention.

The variable feel arm 250 pivots coincident with the variable arm pivot bearings 261 (FIG. 4 (a)) at the first end. The variable feel arm 250 preferably has two variable feel springs 260 fastened one end to the variable feel arm 250 (i.e., the end that rotates out as speed increases), and the other end to the cam follower arm 332. These variable feel springs 260 preferably have no pre-loads in them and the centers of the spring end-hooks coincide with the center of both the pivoting point at the bearings 261, of the variable feel arm 250 and the pivot point 410 in the center of the cam follower arm 332.

Figure 5:
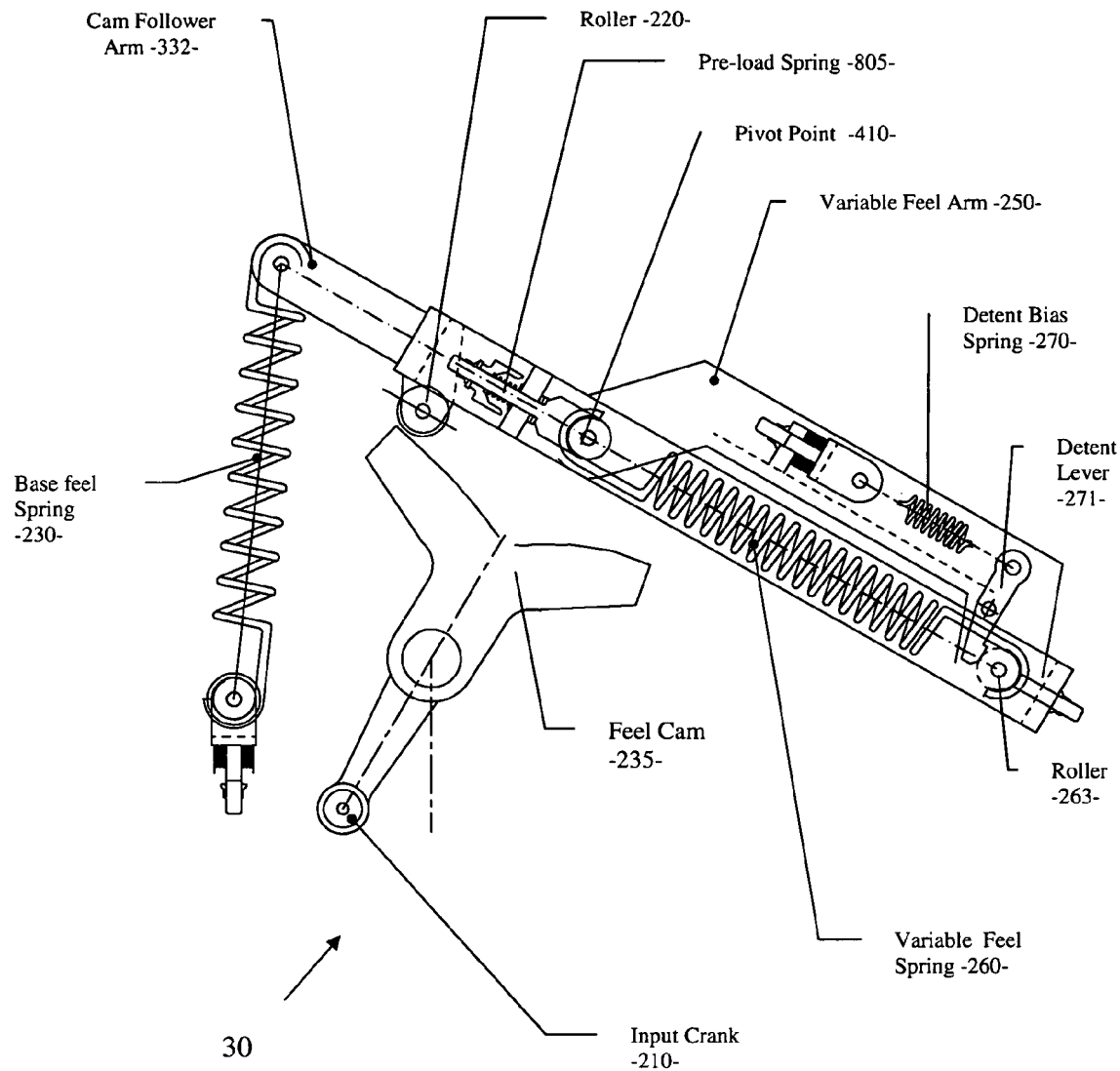
FIG. 5 illustrates a simplified diagram of the exemplary variable feel unit 30 in a "column-aft" position at low airspeed.

During base feel operation, as illustrated in FIG. 5, the cam follower arm 332 moves requiring a feel curve torque at the input shaft 327. As the end of the cam follower arm 332 rotates about its pivot point 410, the variable feel spring 260 length does not change due to its length being identical to the distance between the pivot of the arms. Also, preferably, there is no pre-load in the variable feel spring 260.

Figure 6:
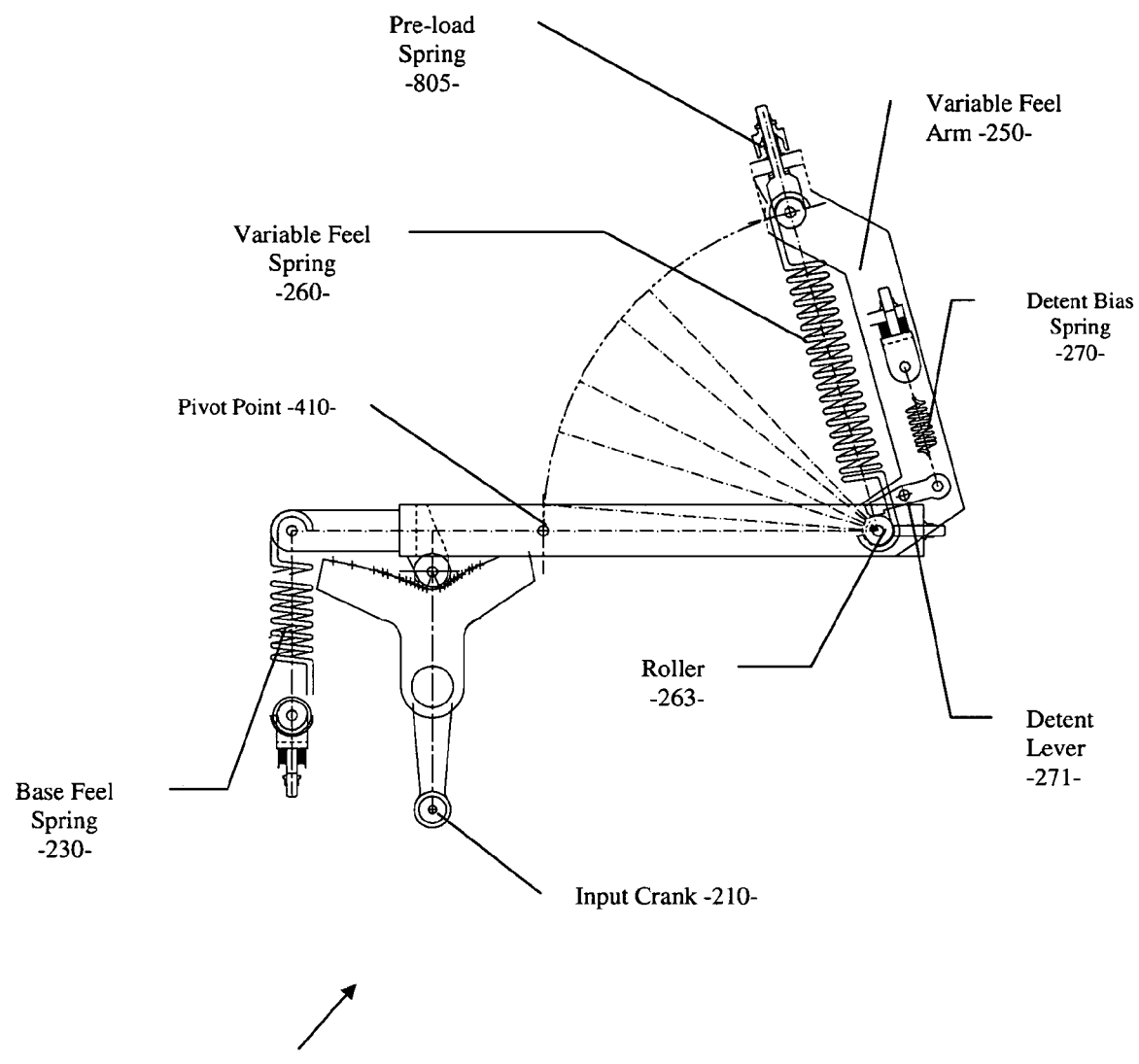
FIG. 6 illustrates the exemplary variable feel unit 30 at higher airspeed, where the variable feel arm 250 is deployed, i.e. rotating about the roller 261 on the cam follower arm 332.
Figure 6:
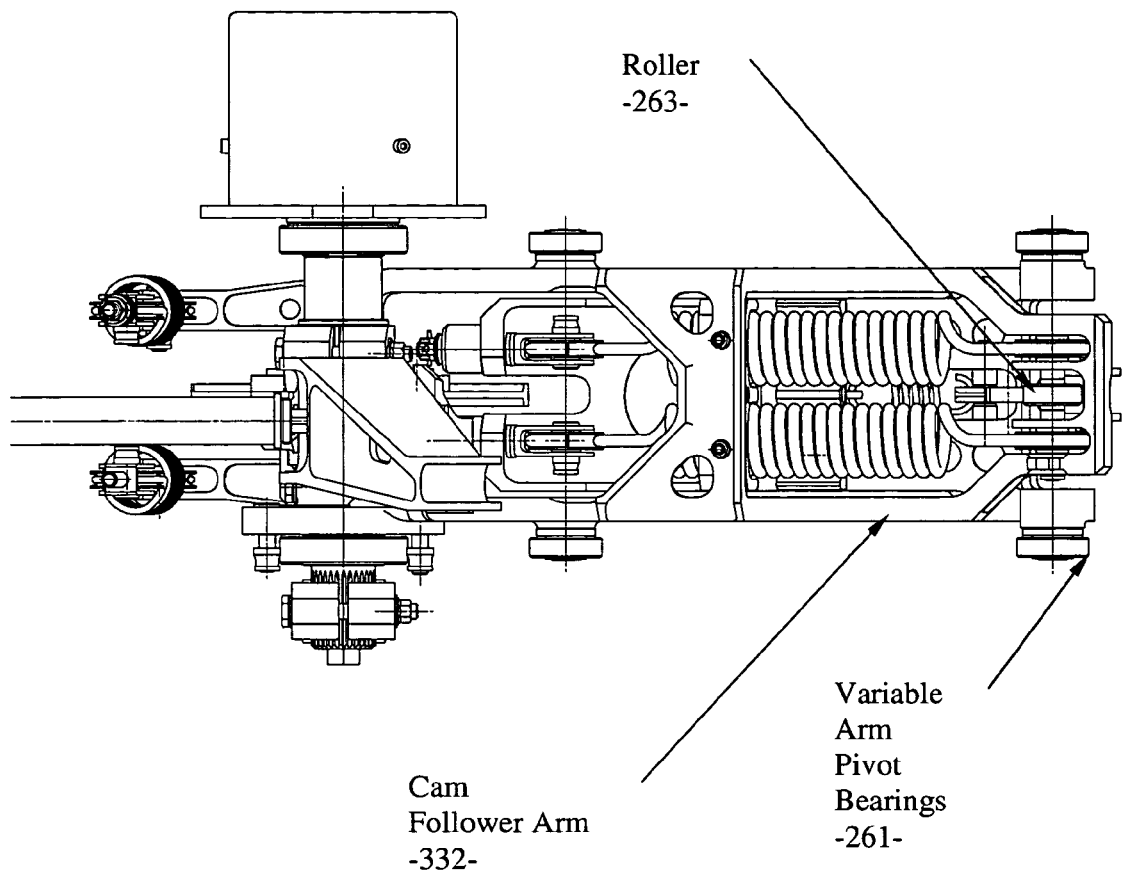
Figure 7:
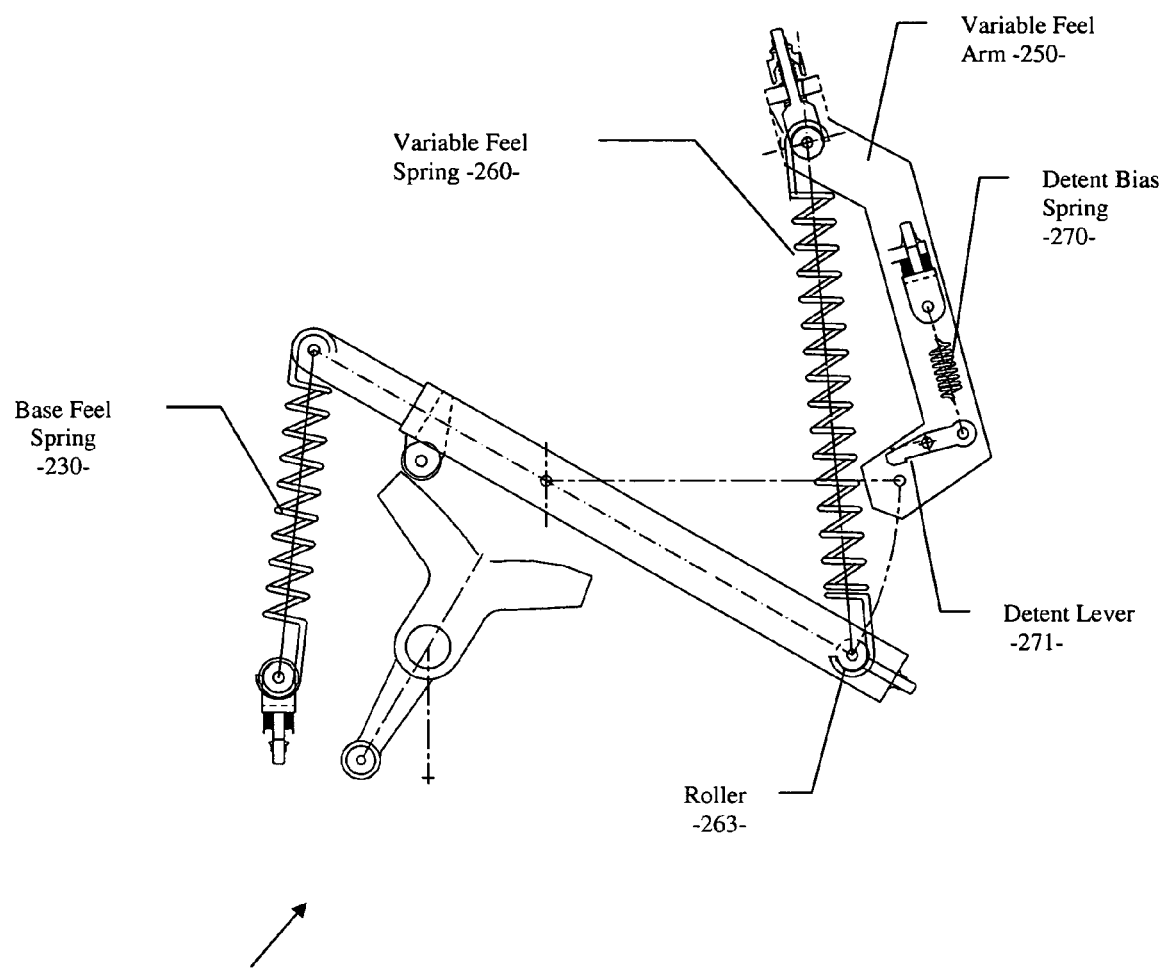
FIG. 7 illustrates the exemplary variable feel unit 30 out of detent at high airspeed, where a column-aft has caused the base feel spring 230 to expand and the variable feel arm 250 is disengaged from the roller 261.

Referring to FIGS. 2 and 6 (a), the feel actuator 430 deploys and rotates the variable feel arm 250 from its stowed position as the airplane velocity changes. With the feel mechanism in its detent position, and as the variable feel actuator 430 moves the variable feel arm 250 through to the high speed positions, there is no extra force being applied to the cam follower arm 332. This is due to the variable feel spring 260 lengths being still the same as the length between the arm pivots, and the fact there is no preload in the variable feel springs 260. This geometry ensures that there is no change to the breakout force as the cam roller 220 is moved out of its detent position, at all speeds. Though the breakout forces are the same, the feel curve changes as a function of the variable feel arm 250 position.

Referring to FIGS. 6 (a), 6 (b) and 7, to compensate for tolerance and to reduce the effect of vibration on zero pre-load springs, the following pre-load springs 805 and a compensating device, i.e. the detent lever 271, are added. The addition of the detent lever 271 does not change the above operating theory, since the effect is similar as the end result is a zero force on the cam follower arm 332 when the cam 325 is in its detent position. The two pre-load springs 805 are compressed to preferably give a 0.050-inch gap at the pre-load housing. The detent bias spring 270 is adjusted to equal the pre-load forces in the pre-load springs 805. As the variable feel arm 250 is rotated through its full travel, the detent lever 271 moves around the roller 263 so that the pre-load forces are always cancelled out. FIG. 6 (b) illustrates a bottom view of the cam follower arm 332. Note that the rotational axis of the roller 263 is aligned to the rotational axis of the variable feel arm bearings 261. Also, the spring end-hooks are attached to the variable arm pivot bearings 261.

FIGS. 4 (a) and (b) illustrate a perspective view of the mechanism. The elevator feel unit 30 has a single cam-and-roller unit. The feel cam 325 attaches by a spline to the input shaft 327 of the elevator feel unit 30. The input crank 210, connected to a control column torque tube (not shown), rotates the input shaft 327 and feel cam 325 in response to the pilot input 200 from the control column. The cam follower arm 332 follows the roller 220 and pivots about the pivot point 410 as the feel cam 325 is rotated. Two base feel springs 230 are preferably provided between the cam follower arm 332 and a fixed point to keep the roller 220 on the feel cam 325. The base feel spring 230 provides the base feel force 280 and self-centering function. Currently two base feel springs are implemented to provide redundancy and better balance, but it should be apparent to those skilled in the art that the number of base feel springs depends on the specific system design.

At low airspeed, the variable feel arm 250 is retracted and applies zero force to the roller 263 (FIG. 6 (b)). As the airspeed of the aircraft changes, the airspeed data is inputted to the FCE 240. The FCE causes the elevator feel actuator 430 to controllably rotate the variable feel arm 250 according to the airspeed of the aircraft. Upon activation by the FCE, the variable feel arm 250 begins to rotate about the variable feel arm bearings 261 (FIG. 4 (a)). Whether at low or high airspeed, the variable feel unit 30 is to maintain its detent position, until the control column is moved by the pilot.

In the foregoing specification, the invention has been described with reference to specific embodiments thereof. It will, however, be evident that various modifications and changes may be made thereto without departing from the broader spirit and scope of the invention. The specification and drawings are accordingly to be regarded in an illustrative rather than a restrictive sense.

We claim:

1. An elevator variable feel unit for aircraft column and wheel control, comprising:
    an input crank (210) coupled to said column and wheel control, having a bottom end and a top end, said input crank being disposed to controllably pivot about a predetermined shaft in response to movement of said column and wheel control;
    a feel cam (325) coupled to the top end of said input crank, said feel cam being disposed to controllably pivot in response to movement of said input crank;
    a cam follower arm (332) coupled to said feel cam, said cam follower arm having a first end, a second end and a pivot point in-between, said cam follower arm being disposed to controllably pivot about said pivot point in response to movement of said feel cam;

at least one base feel spring (230) coupled to said first end of said cam follower arm, said base feel spring being disposed to controllably vary its length in response to pivoting of said cam follower arm;

at least one variable feel arm (250) hingedly coupled to said second end of said cam follower arm, said variable feel arm being disposed to controllably rotate from a stowed position within said cam follower arm to a deployed position, by rotating about said second end, as airspeed is increased, said deployed position forming an predetermined angle with said variable feel arm based on said airspeed;

a variable feel spring (260) coupled between said variable feel arm and said second end of said cam follower arm, said variable feel spring being disposed to controllably add loading to said base feel spring upon movement by said column and wheel control while said variable feel arm is deployed.

2. The elevator variable feel unit of claim 1, further comprising a detent bias spring (270) coupled to said variable feel arm, said detent bias spring being disposed to add loading to said variable feel spring upon movement by said column and wheel control while said variable feel arm is deployed.

3. The elevator variable feel unit of claim 2, wherein said detent bias spring is removably coupled to said variable feel arm at said second end of said cam follower arm, and wherein said detent bias spring is disengaged from said second end upon movement by said column and wheel control while said variable feel arm is deployed, such that loading is applied to said variable feel spring.

4. The elevator variable feel unit of claim 3, wherein said detent bias spring comprises a detent lever (271) removably coupling said variable feel arm to said cam follower arm, said detent lever being disposed to disengage said detent bias spring from said cam follower arm upon movement by said column and wheel control while said variable feel arm is deployed.

5. The elevator variable feel unit of claim 4, further comprising a pre-load spring (805) coupled to said variable feel spring, said pre-load spring being disposed to add loading to said variable feel spring when said variable feel arm is deployed, said loading being continued until said detent bias spring is disengaged from cam follower arm upon movement by said column and wheel control while said variable feel arm is deployed.

6. The elevator variable feel unit of claim 4, wherein said detent lever is disposed to re-engage said cam follower arm upon release of said column and wheel control.

7. The elevator variable feel unit of claim 2, wherein said variable feel arm is disposed to controllably disengage from said cam follower arm upon movement by said column and wheel control while said variable feel arm has rotated from its retracted position.

8. The elevator variable feel unit of claim 7, wherein said variable feel arm is disposed to re-engage said cam follower arm upon said cam follower arm is back to a detent position.

9. The elevator variable feel unit of claim 1, wherein there are two base feel springs and two variable feel arms.

10. An elevator variable feel unit for aircraft column and wheel control, comprising:

an elongated cam follower arm (332), having a first end, a second end and a pivot point in-between;

an input cam assembly (210, 235) movably coupled to said cam follower arm, said input cam assembly having a top end and a bottom end, said top end being movably coupled to said cam follower arm, said input cam assembly being disposed to controllably pivot its top end in response to movement of the column and wheel control;

a first roller (220) coupled between said cam follower arm and said input cam assembly, said first roller being disposed to cause said cam follower arm to pivot about its pivot point in response to the pivoting of said input cam assembly;

at least one base feel spring (230) coupled to said first end of said cam follower arm, said base feel spring being disposed to add loading to the tilting of said cam follower arm by varying its length;

a variable feel arm (250) having a first end and a second end, said first end being hingedly and releasably coupled to said second end of said cam follower arm, said variable feel arm being disposed to controllably rotate its second end from a stowed position parallel to said cam follower arm to a deployed position at higher airspeed, said rotating being about said second end of said cam follower arm;

a variable feel spring (260) being coupled between said second end of said variable feel arm and said second end of said cam follower arm, said variable feel spring being disposed to add loading to said base feel spring upon movement of said column and wheel control while said variable feel arm is in a deployed position.

11. The elevator variable feel unit of claim 10, further comprising:

a detent bias spring (270) coupled between said variable feel arm and said cam follower arm, said detent bias spring being disposed to add loading to said variable feel spring upon disengagement from said cam follower arm upon movement of said column and wheel control while said variable feel arm is in a deployed position;

a detent lever (271) coupling said detent bias spring to said second end of said cam follower arm, said detent lever being disposed to disengage from said cam follower arm in response to movement of the column and wheel control at higher speed while said variable feel arm is in a deployed position, and to re-engage said cam follower arm upon release of the column and wheel control.

12. The elevator variable feel unit of claim 11, further comprising:

a pre-load spring (805) coupled to said variable feel spring, said pre-load spring being disposed to add loading to said variable feel spring until said variable feel arm is disengaged from said cam follower arm.

13. The elevator variable feel unit of claim 12, wherein said detent lever is releasably coupled to a second roller (263), said detent lever being disposed to disengage from said second roller upon movement of said column and wheel control, and re-engage to said roller when said column and wheel control is released.

14. An elevator variable feel unit for aircraft pilot control, comprising:

an input crank which pivots in response to said pilot control;

a cam and a roller unit which pivots in response to the pivoting of said input crank;

a cam follower arm having a first end, a second end and a pivot point in-between, said cam follower arm being disposed to controllably pivot about said pivot point in response to the movement of said cam and roller unit;

a base feel spring coupled between said first end of said cam follower arm and a predetermined point, said base feel spring being disposed to add loading to the pivoting of said cam follower arm by varying its length;

a variable feel arm, having first end and a second end, said second end being disposed to controllably rotate about said second end of said cam follower arm so that said first end moves from a stowed position parallel to said cam follower arm to a deployed position away from said cam follower arm, said second end being disposed to be controllably disengaged from said cam follower arm upon movement by said pilot control while said variable feel arm is deployed;

a variable feel spring coupled between said first end of said variable feel arm and said second end of said cam follower arm, said variable feel spring being disposed to add loading to said cam follower arm when said variable feel arm is disengaged from said cam follower arm upon movement from said pilot control;

a detent bias spring and detent lever coupled to said variable feel spring, being disposed to add loading to said variable feel spring when said variable feel arm is disengaged from said cam follower arm upon movement from said pilot control.

15. The elevator variable feel unit of clam 14, further comprising:

a pre-load spring coupled to said variable feel spring for adding pre-loading.

16. The elevator variable feel unit of claim 14, wherein said detent lever is disposed to cause said variable feel arm to re-engage said cam follower arm when said pilot control is released.

17. The elevator variable feel unit of claim 16, wherein said pivot point on said cam follower arm is in the middle between its first and second end.

18. The elevator variable feel unit of claim 17, wherein said variable feel spring is coupled to said cam follower arm coinciding with a rotational axis of said variable feel arm.

* * * * *